(12) United States Patent  
Lee et al.

(10) Patent No.: US 7,962,023 B2
(45) Date of Patent: Jun. 14, 2011

(54) IMAGE STABILIZER

(75) Inventors: Jin-won Lee, Seongnam-si (KR); Chong-sam Chung, Seongnam-si (KR); Min-jae Lee, Seoul (KR); Sung-hyun Kim, Yongin-si (KR); Hae-in Chung, Uijeongbu-si (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 12/494,811

(22) Filed: Jun. 30, 2009

(65) Prior Publication Data

US 2010/0002301 A1  Jan. 7, 2010

(30) Foreign Application Priority Data

Jul. 3, 2008  (KR) .................. 10-2008-0064478
Jan. 20, 2009 (KR) .................. 10-2009-0004810

(51) Int. Cl.
*G03B 17/00*  (2006.01)
*G02B 27/64* (2006.01)
*H04N 5/228* (2006.01)

(52) U.S. Cl. ...................... 396/55; 359/557; 348/208.11

(58) Field of Classification Search .................... 396/55; 359/554, 557; 348/208.4, 208.7, 208.11
See application file for complete search history.

(56) References Cited

U.S. PATENT DOCUMENTS

| | | | | |
|---|---|---|---|---|
| 5,084,724 A | * | 1/1992 | Maeno ........................... | 396/55 |
| 5,715,479 A | * | 2/1998 | Katayama et al. .............. | 396/55 |
| 5,883,742 A | * | 3/1999 | Kamata ......................... | 359/557 |
| 2008/0074744 A1 | * | 3/2008 | Osaka et al. .................. | 359/554 |

* cited by examiner

*Primary Examiner* — W. B. Perkey
*Assistant Examiner* — Noam Reisner
(74) *Attorney, Agent, or Firm* — The Farrell Law Firm, P.C.

(57) ABSTRACT

An image stabilizer includes a rotor including a lens assembly, and configured to move perpendicular to an optical axis of light passing through the lens assembly, and a suspension unit configured to support movement of the rotor and to prevent the rotor from moving non-perpendicular to the optical axis of the light passing through the lens assembly. Accordingly, the image stabilizer prevents variance of characteristics of a rotor in a low frequency band according to the position and distortion of phase characteristics in a high frequency band. Therefore, the image stabilizer has consistent operation characteristics regardless of the position, posture, and movement of a person using an image capture device containing the image stabilizer.

15 Claims, 24 Drawing Sheets

IMAGE STABILIZER

CROSS-REFERENCE TO RELATED APPLICATIONS

This application claims the benefit under 35 U.S.C. §119(a) of Korean Patent Application No. 10-2008-0064478, filed Jul. 3, 2008, and Korean Patent Application No. 10-2009-0004810, filed Jan. 20, 2009, in the Korean Intellectual Property Office, the disclosures of which are hereby incorporated by reference in their entirety.

TECHNICAL FIELD

The present disclosure relates to an image stabilizer for preventing image degradation and image damage due to shaking, vibrations, or impacts on cameras or electronic devices which capture or photograph images.

BACKGROUND

Digital cameras and camcorders have become widespread, and have made possible for users to take higher quality pictures more easily. However, such hand-held devices may inevitably cause image degradation due to shaking or other movement by users of the devices. Image stabilizers have recently been proposed to correct external vibration factors. However, current image stabilizers may cause undesirable effects, such as a nonlinear response in a low frequency band, a non-uniform gain and phase characteristics with relation to input power, and undesirable characteristics created by friction in a high frequency band.

In order to prevent damage of images due to external vibration such as hand tremors, a method of operating a correction lens by operating an actuator including a rotor and stator together with a correction apparatus to compensate displacements generated due to external vibration such as hand tremors has been used.

Thus, an improved image stabilizer is desired.

SUMMARY

According to an aspect of the present disclosure, there is provided an image stabilizer, including a rotor including a lens assembly, and configured to move perpendicular to an optical axis of light passing through the lens assembly, and a suspension unit configured to support movement of the rotor and to prevent the rotor from moving non-perpendicular to the optical axis of the light passing through the lens assembly.

The suspension unit may elastically support the rotor with respect to a first stator and a second stator between which the rotor is disposed, and be formed of materials capable of carrying an electric current so as to supply power to the rotor.

The suspension unit may include a plurality of first suspension members elastically supporting the rotor with respect to the first stator, the plurality of first suspension members electrically connecting the first stator and the rotor, and a plurality of second suspension members elastically supporting the rotor with respect to the second stator, the plurality of second suspension members electrically connecting the second stator and the rotor.

The first suspension members and the second suspension members may be symmetrically disposed with respect to the rotor.

The first suspension members and the second suspension members may include the same physical characteristics, and be formed as one of wires and plates made of metallic materials capable of carrying an electric current.

The rotor may include a plurality of driving coils disposed around the lens assembly, and a plurality of side printed circuit substrates electrically connected to the first stator and the second stator, the first stator and the second stator respectively may include a plurality of magnets disposed on a surface corresponding to the plurality of driving coils and a first stator printed circuit substrate and a second stator printed circuit substrate, wherein first ends of the plurality of first suspension members may be connected to the side printed circuit substrates, and second ends of the plurality of first suspension members may be connected to the first stator printed circuit substrate, and wherein first ends of the plurality of second suspension members may be connected to the side printed circuit substrates, and second ends of the plurality of second suspension members may be connected to the second stator printed circuit substrate.

The plurality of first suspension members and the plurality of second suspension members may be symmetrically disposed.

The driving coils and the magnets may be symmetrically disposed.

The first stator and the second stator may be connected using a plurality of supporting members, wherein the plurality of supporting members may be complementarily formed on the first stator and the second stator.

The first stator may include a first stator body, the second stator may include a second stator body, and the first suspension members and the second suspension members may be formed with the first stator body and the second stator body, respectively, by injection molding.

The first suspension members and the second suspension members may be respectively inserted into and connected to the first stator body and the second stator body.

The image stabilizer may further include a locking unit for fixing the rotor to prevent movement if power is not supplied to the rotor, and for releasing locking of the locking unit if power is supplied to the rotor.

The first suspension members and the second suspension members may include a plurality of curved portions.

The curved portions of the first suspension members and the second suspension members may be rounded.

The first suspension members and the second suspension members may include a plurality of bosses and a plurality of boss holes so as to be fixed to the first stator body and the second stator body, respectively.

The first stator body and the second stator body may include fixing bosses to fix the first suspension members and the second suspension members, respectively, and the first suspension members and the second suspension members may include a pad including boss holes corresponding to the fixing bosses, wherein the first suspension members and the second suspension members may be fixed by pressing the fixing bosses penetrating the boss holes at a high temperature.

According to an aspect of the present disclosure, there is provided an image stabilizer, including a first stator and a second stator, a rotor including a lens assembly, and configured to move perpendicular to an optical axis of light passing through the lens assembly, and a suspension unit configured to elastically support the rotor, the first stator, and the second stator so as to electrically connect the rotor, the first stator, and the second stator, the suspension unit including a plurality of curved portions so as to prevent the rotor from moving non-perpendicular to the optical axis of the light passing through the lens assembly.

As may be appreciated from the above description, an image stabilizer 100 according to an embodiment may prevent variance of characteristics of a rotor in a low frequency band according to the position and distortion of phase characteristics in a high frequency band. Therefore, the image stabilizer 100 may have consistent operation characteristics regardless of the position and posture of a person using an image capture device that incorporates the image stabilizer 100.

Furthermore, since characteristic distortion does not occur in a high frequency band, the operating band ensured by an actuator consisting of a rotor and a stator extends and thus response to shake frequency increases.

Moreover, since suspension members are symmetrically arranged with respect to the rotor, malfunction of the image stabilizer without ball bearings in an existing lateral suspension structure may be prevented.

BRIEF DESCRIPTION OF THE DRAWINGS

Various features and advantages of the disclosure will become more apparent by the following detailed description of several embodiments thereof with reference to the attached drawings, of which.

DETAILED DESCRIPTION OF EMBODIMENTS

Figure 1:
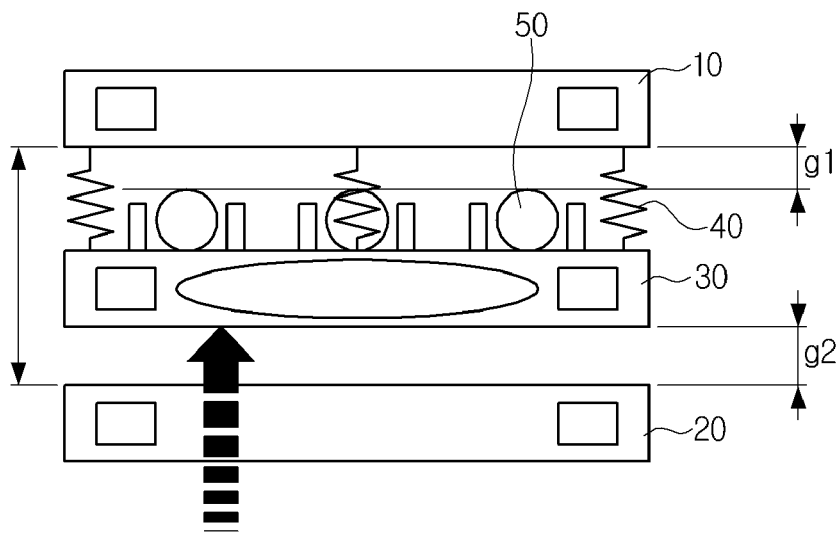
FIGS. 1 and 2 illustrate examples of image stabilizers having a general lateral spring structure.

Reference will now be made in detail to embodiments of the present invention, examples of which are illustrated in the accompanying drawings, wherein like reference numerals refer to like elements. While the embodiments are described with detailed construction and elements to assist in a comprehensive understanding of the various applications and advantages of the embodiments, it should be apparent however that the embodiments can be carried out without those specifically detailed particulars. Also, well-known functions or constructions will not be described in detail so as to avoid obscuring the description with unnecessary detail. It should be also noted that in the drawings, the dimensions of the features are not intended to be to true scale and may be exaggerated for the sake of allowing greater understanding.

Figure 2:
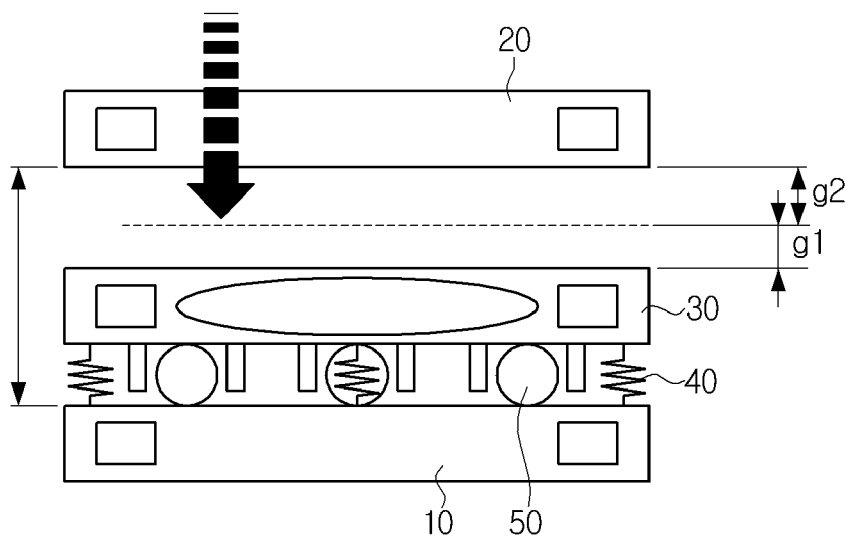

FIGS. 1 and 2 are schematic diagrams illustrating an example of a conventional image stabilizer. The image stabilizer may include a first stator 10, a second stator 20, a rotor 30, a plurality of suspension members 40 interposed between the first stator 10 and the rotor 30, and ball bearings 50 installed on the rotor 30.

The suspension members 40, which support the rotor 30, may have a significant difference in their functionality depending upon the position of the image stabilizer. For example, as illustrated in FIG. 1, if the first stator 10 is positioned above the second stator 20, the suspension members 40 are extended by the distance g1 due to gravity so that the first stator 10 and the ball bearings 50 are spaced apart and are not in contact with each other. In this example, the rotor 30 and the second stator 20 are spaced apart by distance g2. However, as illustrated in FIG. 2, if the second stator 20 is positioned above the first stator 10, the suspension members 40 are compressed by the weight of the rotor 30 so that the first stator 10 is in contact with the ball bearings 50 installed on the rotor 30. In this example, the second stator 20 and the rotor 30 are spaced apart by the distance g1+g2. Accordingly, when the rotor 30 moves in a direction perpendicular to the optical axis, its performance is affected by the friction between the first stator 10 and the ball bearings 50.

If the suspension members 40 have such a lateral spring structure in which the suspension members 40 are disposed only between the first stator 10 and the rotor 30, as illustrated in the schematic diagrams of FIG. 1 and FIG. 2, conditional operation control is required since the operating conditions vary as the suspension members 40 are either extended or retracted.

Figure 3:
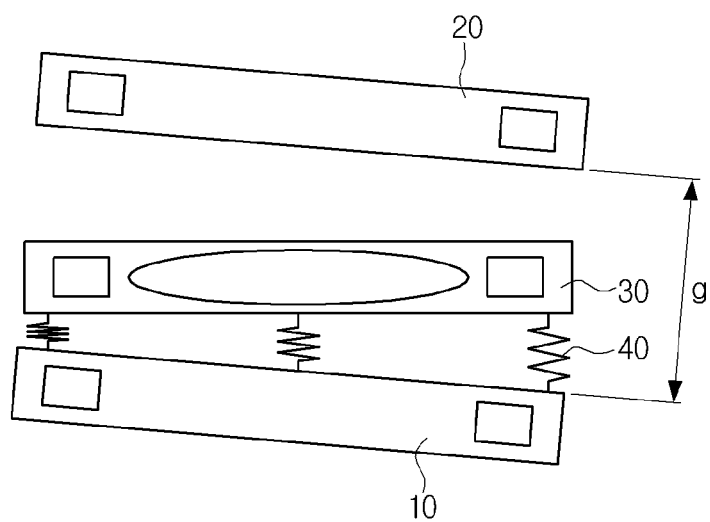
FIG. 3 illustrates an example of image stabilizer having a general lateral spring structure when ball bearings are not included.

FIG. 3 illustrates an additional conventional image stabilizer. In FIG. 3, the rotor 30 is located above the first stator 10 and is tilted. Since distance g between the first stator 10 and the second stator 20 is uniform, the plurality of suspension members 40 may support the rotor 30 with different displacements. Accordingly, if the ball bearings 50 are not installed, abnormal contact or interference may occur between the first stator 10 and the rotor 30, as illustrated in FIG. 3, causing the image stabilizer to possibly malfunction. Therefore, such a lateral spring structure should necessarily include the ball bearings 50, as illustrated in FIGS. 1 and 2.

Figure 4:
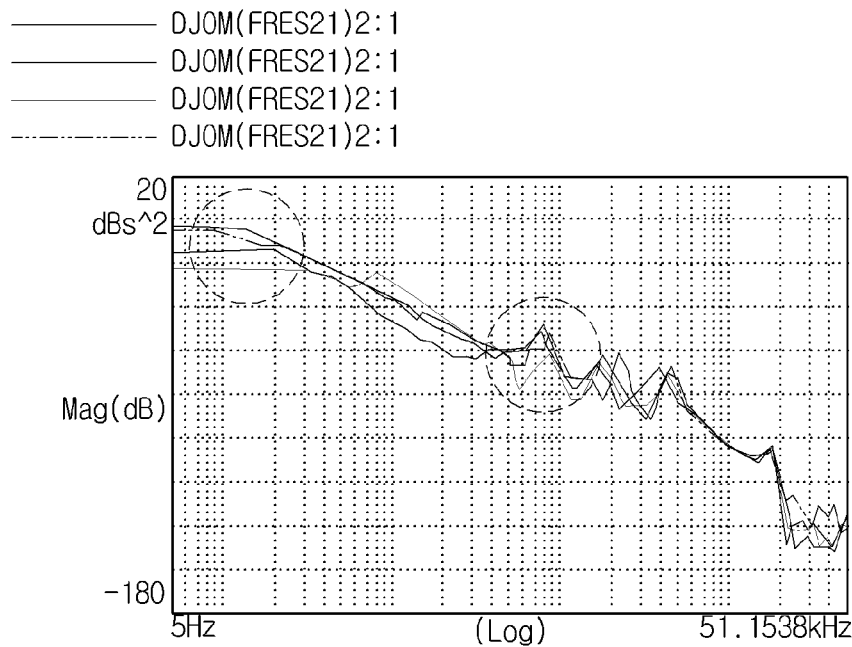
FIGS. 4 and 5 are graphs illustrating dynamic characteristics of an image stabilizer having a general lateral spring structure.
Figure 5:
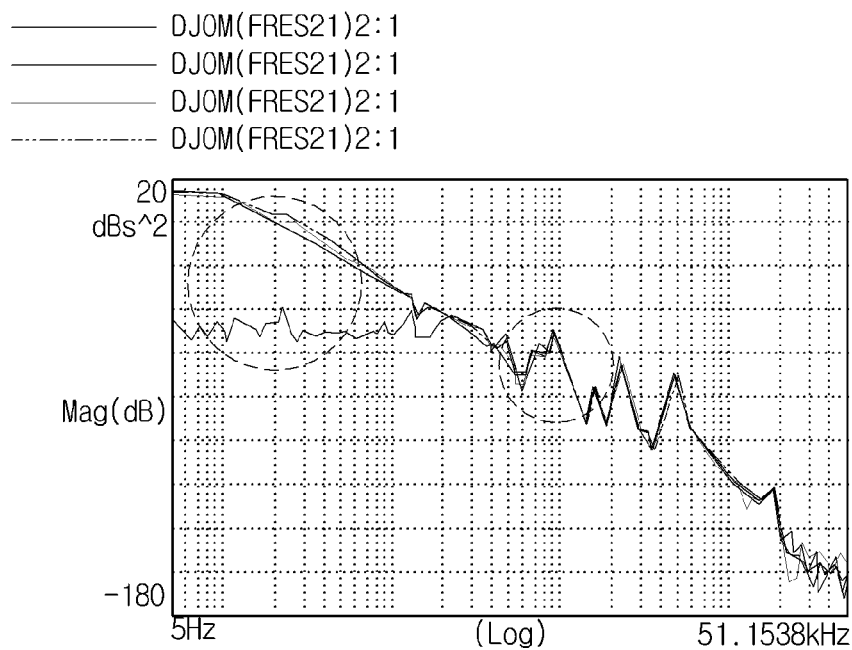

FIGS. 4 and 5 are graphs illustrating characteristics of the conventional image stabilizer shown in FIGS. 1 and 2 according to an input value and position. As illustrated in FIG. 4, when an input value is higher than a certain value, characteristics of the image stabilizer are the same. However, as illustrated in the area indicated by the dotted circles, when an input value is lower than the certain value, gain characteristics in a low frequency band vary. That is, based on the measurement result, the higher an input value, the higher the direct current (DC) sensitivity becomes, but alternating current (AC) sensitivity is largely unaffected by the input value. This indicates that the size of the input value is dominated by friction in a low frequency band, signifying that the friction is a major factor for design.

In addition, as illustrated in FIG. 5, high frequency characteristics cause subsidiary resonance in a low frequency band relative to resonance characteristics of a lens holder formed in the rotor, indicating that the ball bearings 50 or suspension members 40 may cause degradation in high frequency characteristics.

Furthermore, in phase, a 90° delay frequency differs according to an input value in a low frequency band. Magnitude and phase response show nonlinearity since the resonant frequency of a system changes according to the magnitude of an input value. In this case, since it is difficult to obtain an approximated linear model, the DC sensitivity varies according to the size of the input value and has a small value. In order to implement sufficient tracking performance, DC gain must be increased. However, since there is a limit in increasing the gain of a controller due to the sub-resonance characteristics in a high frequency band, it may be technically difficult to implement the image stabilizer. In addition, there may be shortcomings, such as, e.g., structural noise, characteristic degradation caused by friction, and a decrease in response caused by the gear structure.

Figure 6:
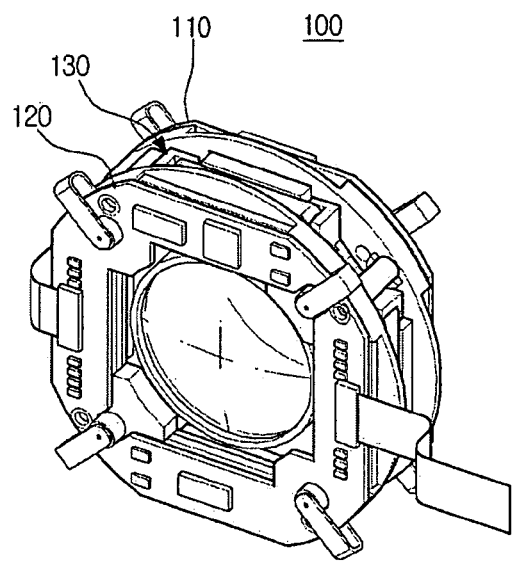
FIG. 6 is a perspective view illustrating an image stabilizer according to an embodiment.

FIG. 6 is a perspective view illustrating an image stabilizer 100 according to an embodiment. As illustrated, the image stabilizer 100 may include a first stator 110, a second stator 120, and a rotor 130. As illustrated in the side view of the image stabilizer 100 in FIG. 7, the rotor 130 may be interposed between the first stator 110 and the second stator 120 by elastic support of a suspension unit 140.

Figure 7:
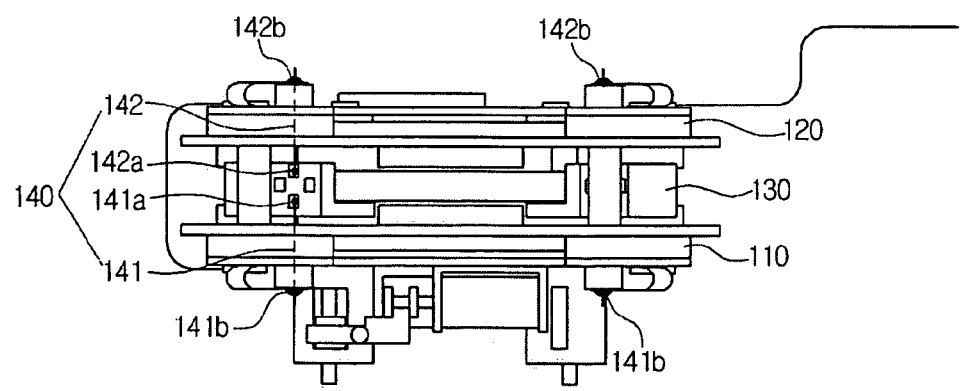
FIG. 7 is a side view of the image stabilizer of FIG. 6.
Figure 8:
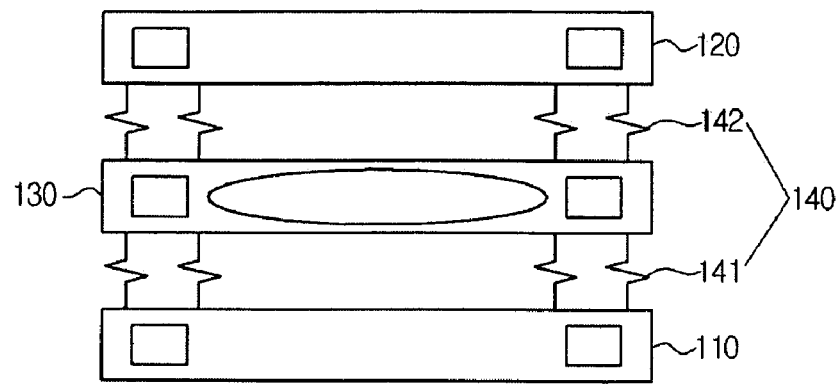
FIG. 8 is a diagram schematically modeling the image stabilizer of FIG. 7.

FIG. 8 is a diagram schematically modeling the image stabilizer 100 of FIGS. 6 and 7. The rotor 130 may be interposed between the first stator 110 and the second stator 120 and may be elastically supported by the suspension unit 140 that includes first suspension members 141 and second suspension members 142. The first and second suspension members 141 and 142 may have the same spring constant.

The suspension unit 140 may support the rotor 130 with respect to the first and second stators 110 and 120 so that an electric current may be applied between the rotor 130 and the first and second stators 110 and 120. This prevents the rotor 130 from tilting according to a user's position, posture, or movement. In addition, the suspension unit 140 may supply power to a driving coil 133 (see FIG. 20) of the rotor 130, allowing the driving coil 133 to be magnetized. The suspension unit 140 may include a plurality of first suspension members 141, formed between the first stator 110 and the rotor 130, as well as a plurality of second suspension members 142, formed between the second stator 120 and the rotor 130.

In this embodiment, the first and second suspension members 141 and 142 may be metal wires or metal plates that may carry an electric current and that may possess the same physical characteristics.

Figure 9:
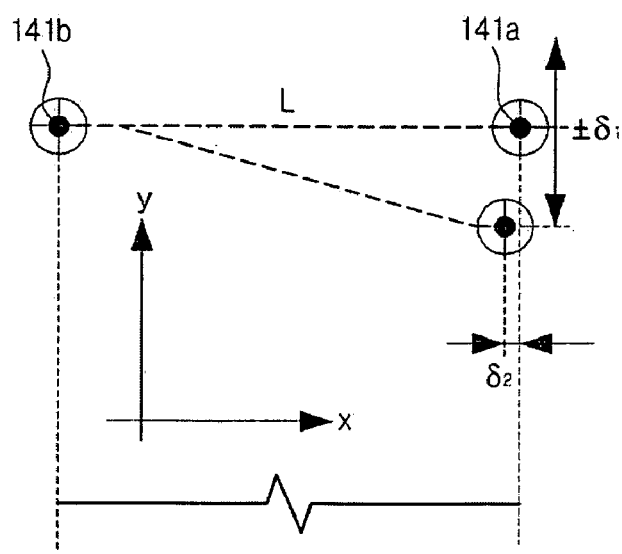
FIG. 9 schematically illustrates a displacement generation state of a suspension unit according to an embodiment.
Figure 12:
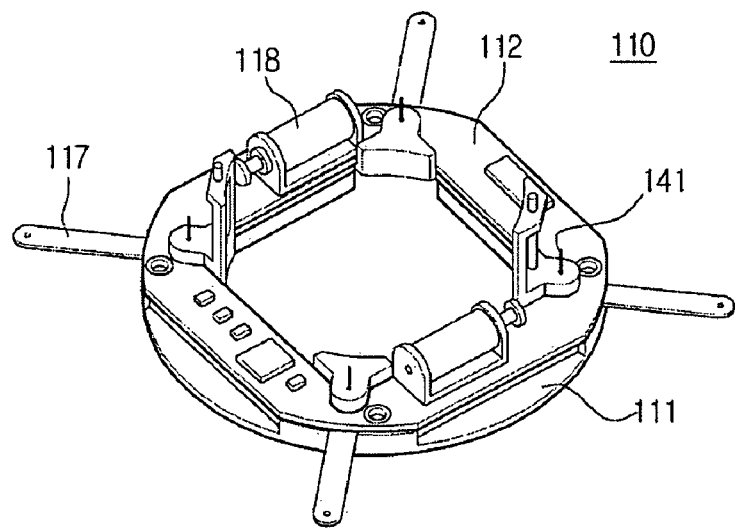
FIGS. 12 through 15 illustrate a structure of the first stator according to an embodiment.

FIG. 9 schematically illustrates an example of displacement generation of the first suspension members 141 according to an embodiment. As illustrated, a first connection part, which may be connected to a side printed circuit substrate 132 (see FIG. 20) of the rotor 130, is expressed as 141a, and a second connection part, which may be connected to a first stator printed circuit substrate 112 (see FIG. 12), is expressed as 141b. The first connection part 141a is where displacement occurs according to the movement of the rotor 130, and the second connection part 141b maintains a fixed state. The first suspension members 141 may have a structure in which bending, both extension and retraction, can occur concurrently. If a length of the first suspension members 141 is L, a; bending displacement is δ1, and an extension and compression displacement is δ2, the relationship between them is expressed as below in Equation 1

$$L^2+\delta_1^2=(L+\delta_2)^2$$ Equation 1:

In Equation 1, δ is F/k, where k is an elasticity coefficient.

Accordingly, in direction y, in which the rotor 130 moves perpendicular to an optical axis, a displacement of ±δ1 occurs, and in direction x, in which the rotor 130 moves parallel to the optical axis, a displacement of ±δ2 occurs. Accordingly, in order for the rotor 130 to maintain a parallel position to the first and second stators 110 and 120, the first and second suspension members 141 and 142 desirably have the same physical characteristics.

One end of each of the first suspension members 141 may be connected to the side printed circuit substrate 132 by, e.g., soldering, and the other end of each of the first suspension members 141 may be connected to the first stator printed circuit substrate 112 by, e.g., soldering. Similarly, one end of each of the second suspension members 142 corresponding to the one end of each of the first suspension members 141 may be connected to the side printed circuit substrate 132, and the other end of each of the second suspension members 142 corresponding to the other end of each of the first suspension members 141 may be connected to the second stator printed circuit substrate 122.

In this embodiment, the first and second suspension members 141 and 142 may be symmetrically disposed with respect to the optical axis of a lens assembly 136 (see FIG. 20) of the rotor 130, where one end of each of the first and second suspension members 141 and 142 is connected to the side printed circuit substrate 132 on one side of the rotor 130, and the other end of each of the first and second suspension members 141 and 142 is connected to the first and second stator printed circuit substrates 112 and 122, respectively.

Figure 10:
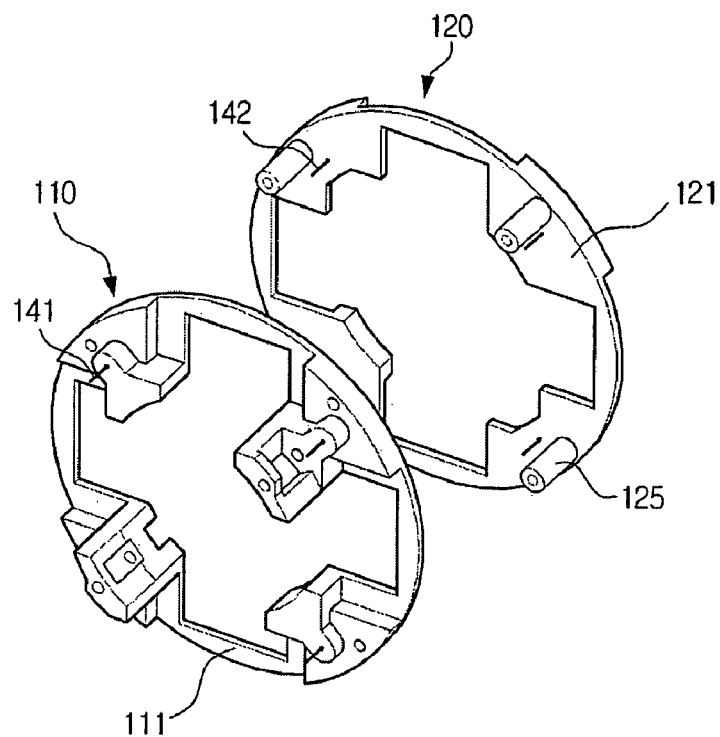
FIG. 10 is an exploded perspective view illustrating assembly of a first stator and a second stator according to an embodiment.
Figure 11:
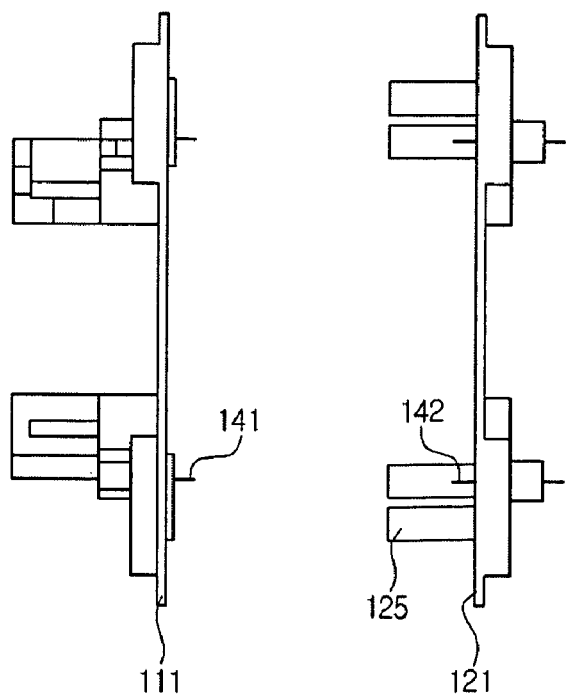
FIG. 11 is a side view of the first stator and the second stator of FIG. 10.
Figure 13:
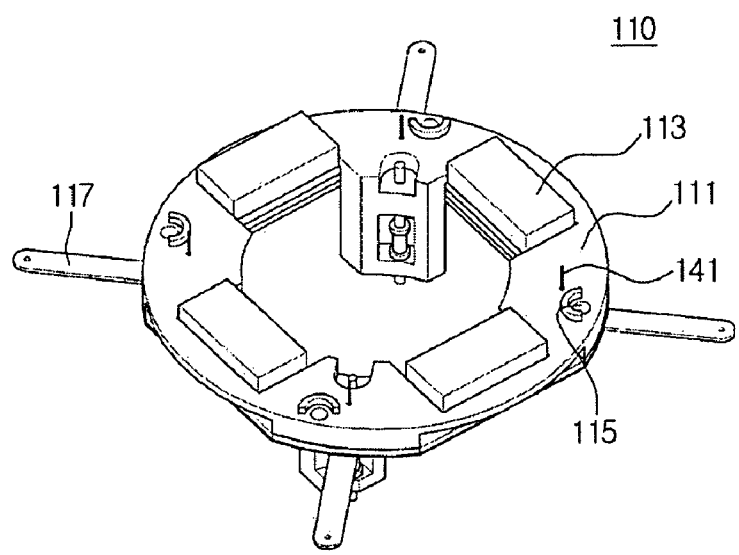
Figure 14:
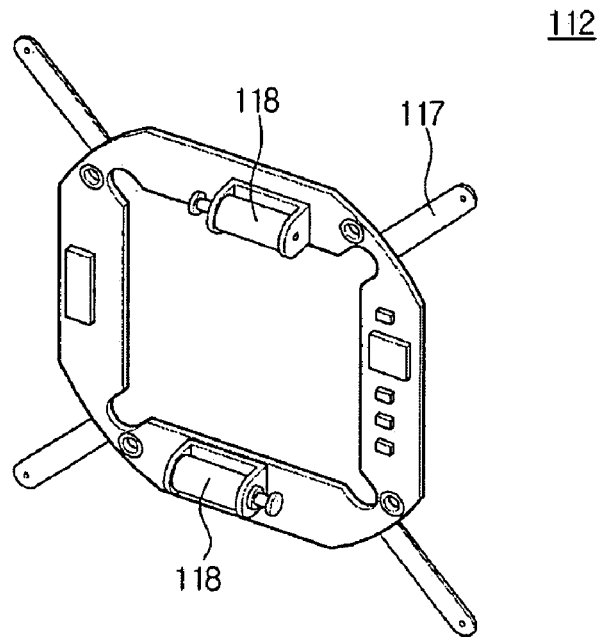
Figure 15:
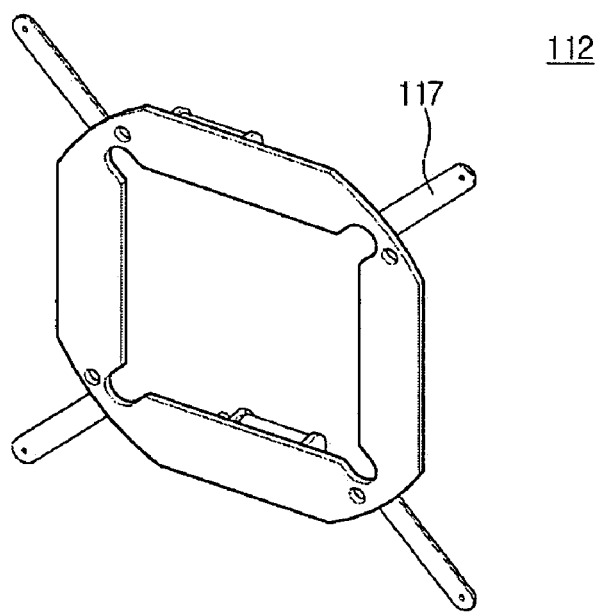
Figure 16:
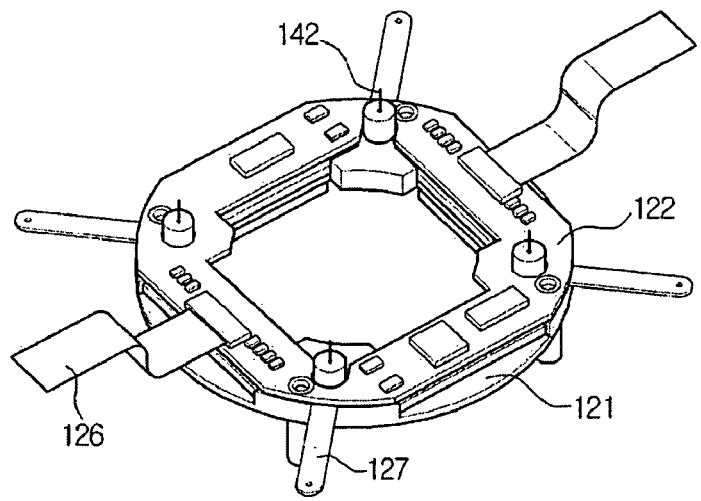
FIGS. 16 through 19 illustrate a structure of the second stator according to an embodiment.
Figure 17:
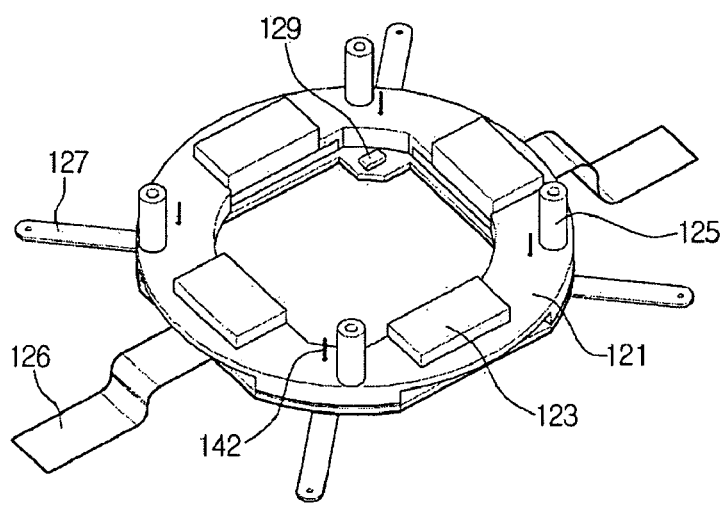
Figure 18:
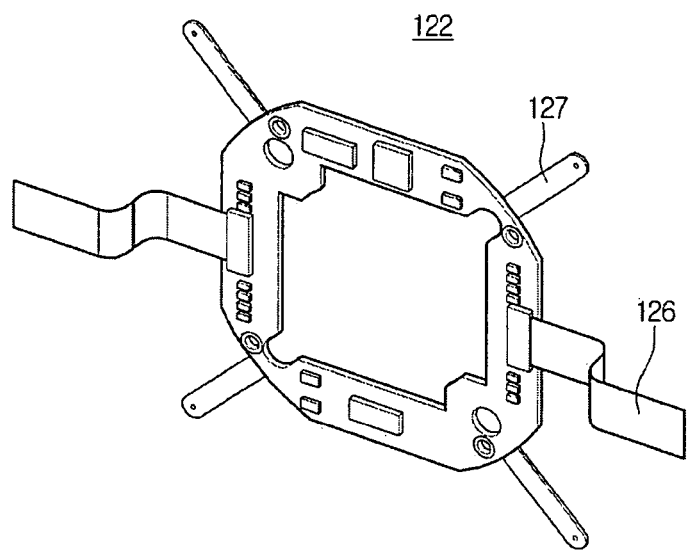
Figure 19:
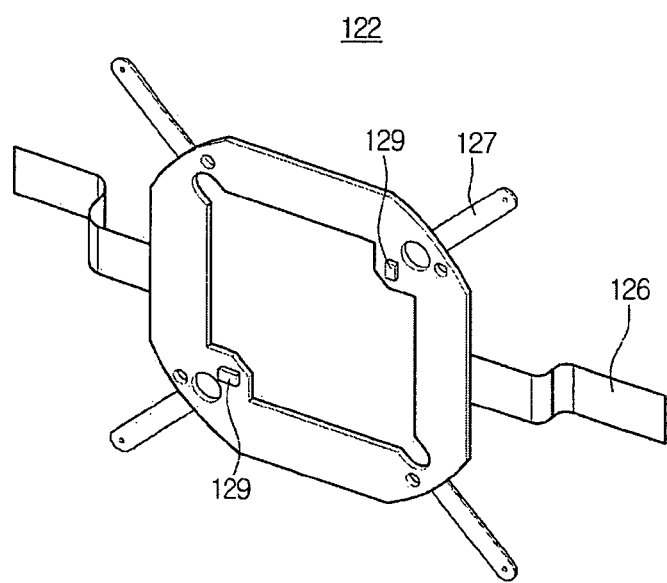

FIGS. 10 and 11 are exploded perspective views illustrating connection of the first and second stators 110 and 120. The first and second stators 110 and 120 are spaced apart so that the rotor 130 may be disposed therebetween. To this end, a first stator body 111 and a second stator body 121 may have a supporting groove 115 and a supporting member 125, respectively. The supporting groove 115 (See FIG. 13) and the supporting member 125 may be complementarily formed and connected using a screw, for example, and the first and second stators 110 and 120 are assembled thereby.

As illustrated in FIGS. 12 to 15, the first stator 110 may include a first stator body 111, a first stator printed circuit substrate 112, a first magnet 113, a first connection member 117, which may be electrically connected to a first suspension member 141, and a locking unit 118, which may lock the movement of the rotor 130 and may be generally formed as a solenoid.

As illustrated in FIGS. 16 to 19, the second stator 120 may include a second stator body 121, a second stator printed circuit substrate 122, a second magnet 123, a main connection member 126, which may be connected to, for example, a control unit of an electronic device in order to receive operation commands, a second connection member 127, which may be electrically connected to a second suspension member 142, and a first sensor 129, which may sense a change of the position of the rotor 130.

The first and second stator bodies 111 and 121 may be formed of material, such as, e.g., plastic, by injection molding. The first and second stator bodies 111 and 121 may be formed by injection molding after disposing the first and second suspension members 141 and 142 on a certain area of the mold. Alternatively, the first and second stator bodies 111 and 121 may be formed first by injection molding and may then be connected to the first and second suspension members 141 and 142 at a certain area of the mold by penetration.

Figure 20:
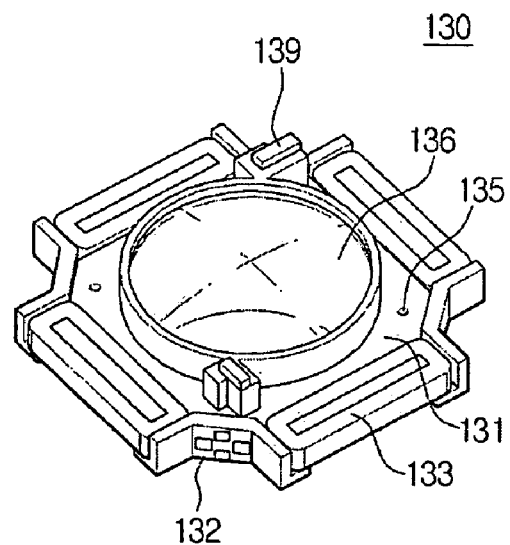
FIGS. 20 and 21 are perspective views illustrating a structure of a rotor according to an embodiment.
Figure 21:
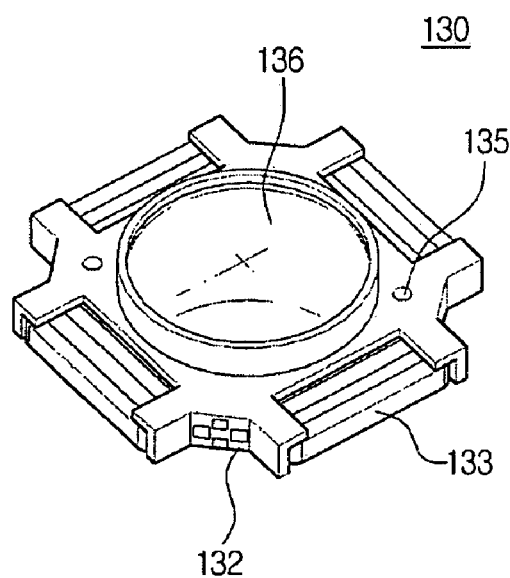

The rotor 130 moves perpendicular to an optical axis, in order to compensate for external shaking and movement by a user, and is disposed between the first stator 110 and the second stator 120. As illustrated in FIGS. 20 and 21, the rotor 130 may include a rotor body 131, at the center of which a lens assembly 136 is disposed, a plurality of side printed circuit substrates 132 formed on the circumference of the rotor body 131, and a driving coil 133 disposed at a position corresponding to a position of the first and second magnets 113 and 123. The rotor 130 may further include a plurality of receiving grooves 135 for receiving a locking member (not shown) of the locking unit 118 (see FIG. 12) in order to fix the rotor 130 when the image stabilizer 100 is not in operation. A second sensor 139 may be disposed at a position corresponding to a position of the first sensor 129 of the second stator 120 to sense a displacement of the rotor 130.

As illustrated, the first and second magnets 113 and 123, which may be installed in the first and second stators 110 and 120, respectively, and the driving coils 133 of the rotor 130 may face one another.

Figure 22:
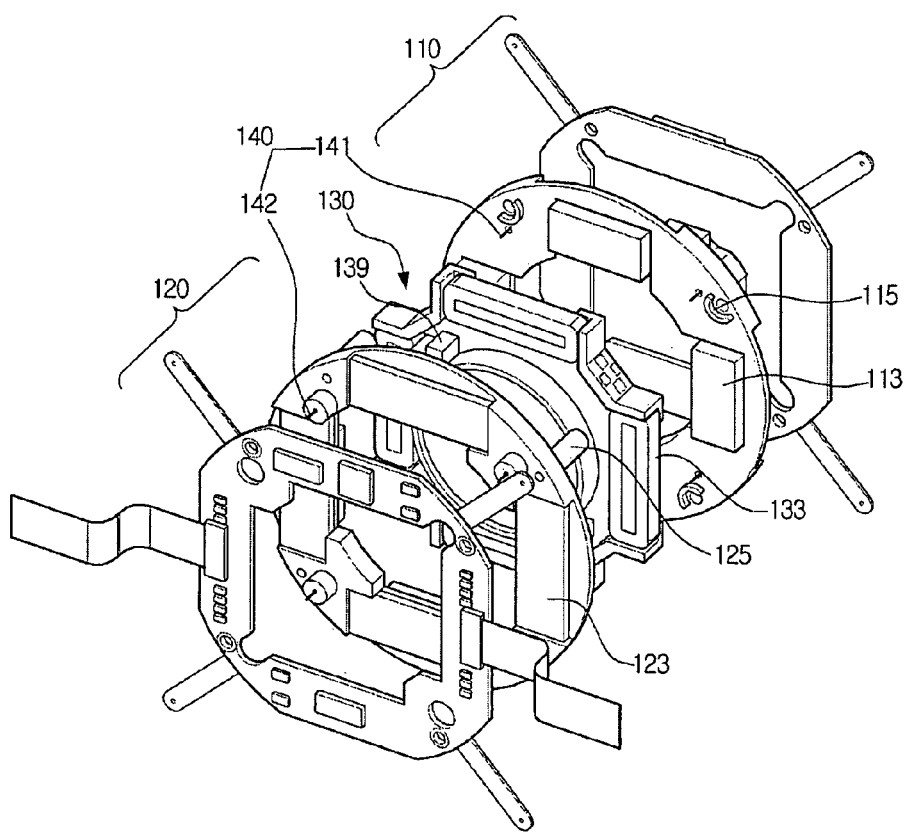
FIGS. 22 and 23 are exploded perspective views illustrating assembly of the image stabilizer according to an embodiment.
Figure 23:
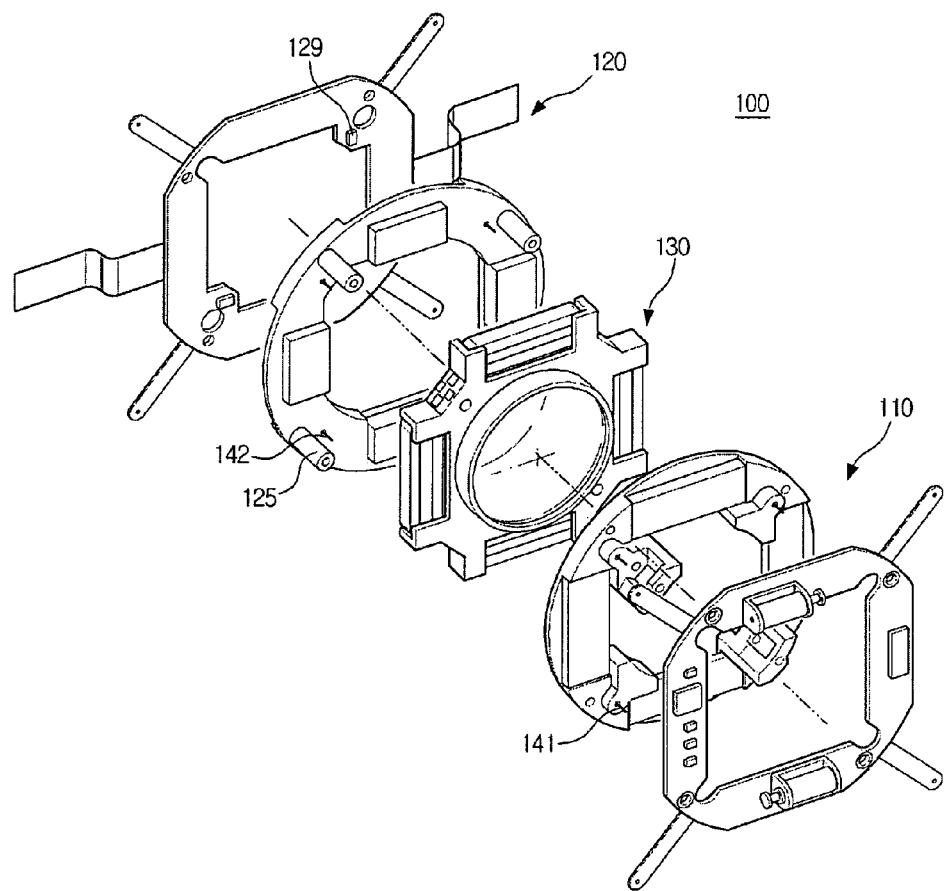
Figure 24:
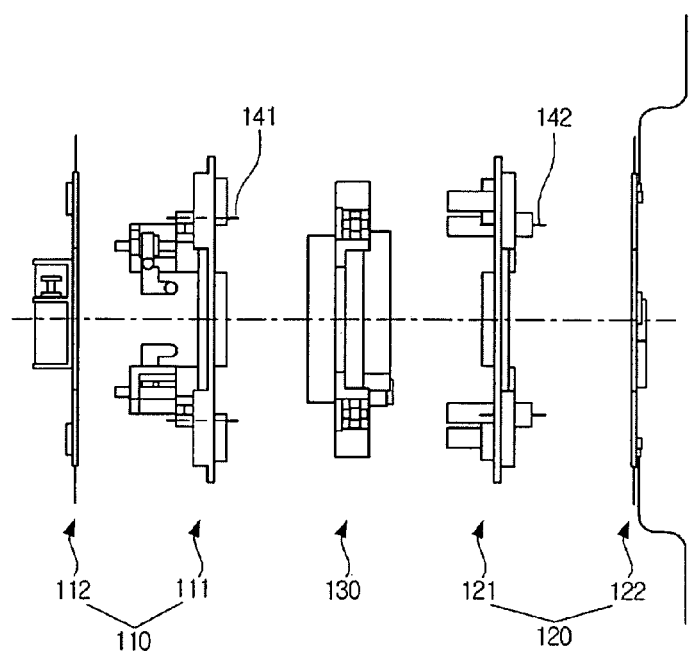
FIG. 24 is an exploded side view illustrating assembly of the image stabilizer of FIG. 23.

A process of assembling the image stabilizer 100, according to an embodiment, is described with reference to FIGS. 22 to 24. The first and second stator bodies 111 and 121 may be formed of a material such as plastic by injection molding. In this case, the first and second suspension members 141 and 142 may be disposed in the mold to form the first and second stator bodies 111 and 121, respectively, to allow for the first and second suspension members 141 and 142 to be disposed concurrently when the first and second stator bodies 111 and 121 are formed by injection molding. Subsequently, the first stator magnet 113 may be formed on the first stator body 111, while the second stator magnet 123 and the sensor 129 may be formed on the second stator body 121. The rotor 130 may then be interposed between the first stator 110 and the second stator 120, and then the first and second stator bodies 111 and 121 may be connected and fixed through the supporting grooves 115 and the supporting members 125. The second sensor 139 installed on the rotor 130 may be disposed at a position corresponding to the position of the first sensor 129 of the second stator 120.

In order for the rotor 130 not to tilt, one end of each of the first and second suspension members 141 and 142 is connected to the side printed circuit substrate 132 by soldering, for example, and the other end of each of the first and second suspension members 141 and 142 is connected to the first and second stator printed circuit substrates 113 and 123, respectively, by soldering, for example. In this embodiment, a longitudinal direction of the first and second suspension members 141 and 142 is parallel to the direction of the optical axis. Therefore, the rotor 130 does not move in association with inclination of the first and second stators 110 and 120. When the rotor 130 moves perpendicular to the optical axis for image stabilization, if a force higher than the spring constant of the first and second suspension members 141 and 142 is applied, the rotor 130 may move without interference.

Figure 25:
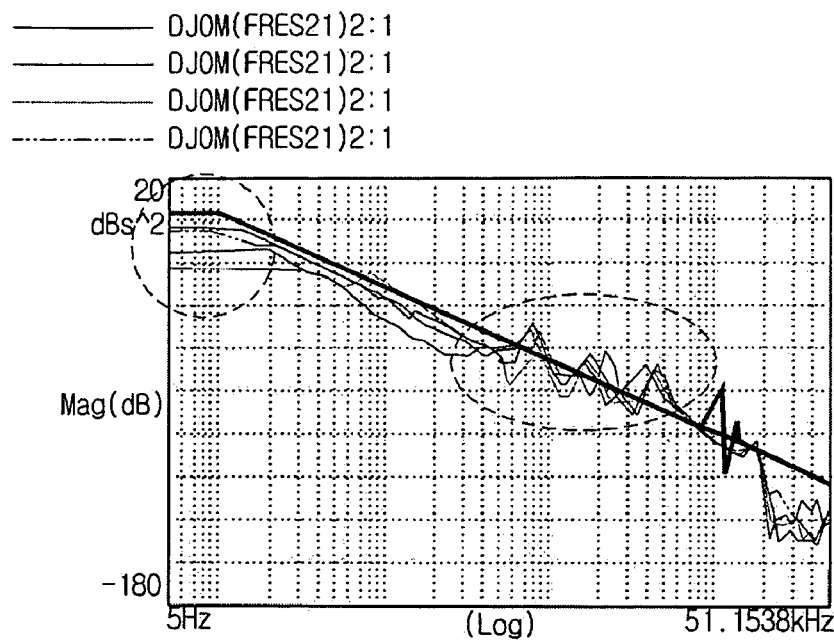
FIGS. 25 and 26 are graphs illustrating dynamic characteristics of the image stabilizer according to an embodiment.
Figure 26:
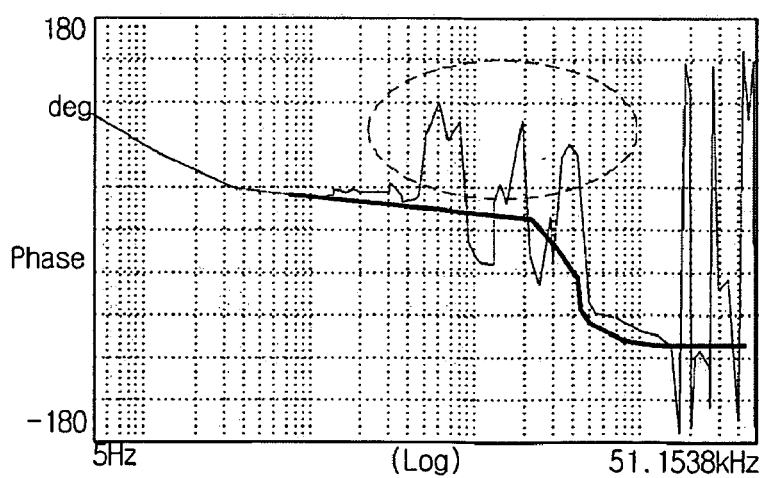

Improved characteristics of the image stabilizer 100 according to the embodiment above describe with respect to the input value and position is illustrated with reference to FIGS. 25 and 26. The thick line illustrates the dynamic characteristics of the image stabilizer 100. FIG. 25 shows, through simulation, that low frequency band gain characteristics are regularly maintained unlike the areas indicated by the dotted circles representing a conventional image stabilizer expressed as the thin lines. FIG. 26 shows that due to improved resonance characteristics of the rotor 130 in a high frequency band, degradation of high frequency characteristics by friction is reduced. That is, since the suspension unit 140 according to the embodiments of the present invention is not a friction support type, operation characteristics of the suspension unit 140 are consistent regardless of the position. Accordingly, compared with a conventional suspension unit of a friction support type, the suspension unit 140 may remarkably reduce occurrence of distortion of phase characteristics in a high frequency area, so the operating band for an actuator consisting of the first and second stators 110 and 120 and the rotor 130 is extended, resulting in increased response to a shake frequency.

Figure 27:
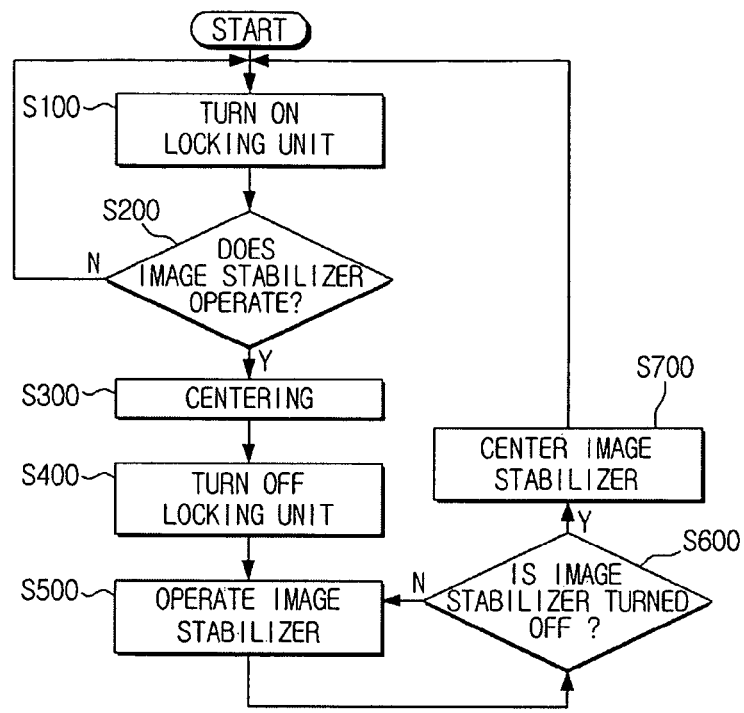
FIGS. 27 and 28 are flow charts illustrating an image stabilizing method of the image stabilizer according to an embodiment.

An image stabilizing method is described with reference to FIGS. 27 and 28. As illustrated in FIG. 27, if power is supplied, the image stabilizer 100 maintains a state locked by the locking unit 118 so that the rotor 130 may be fixed at the center of the optical axis (S100). If the image stabilizer 100 starts operating (S200), a centering electric current is applied to the rotor 130 so that the rotor 130 floats between the first stator 110 and the second stator 120 (S300), and locking of the locking unit 118 is released (S400). Subsequently, the image stabilizer 100 performs image stabilization in order to compensate displacement of the rotor 130 by sensing shaking by the rotor 130 due to, e.g., hand tremors (S500). If image stabilization is completed (S600), the rotor 130 is initialized to be located at the center of the optical axis (S700), and the locking unit 118 fixes the position of the rotor 130 (S100).

Figure 28:
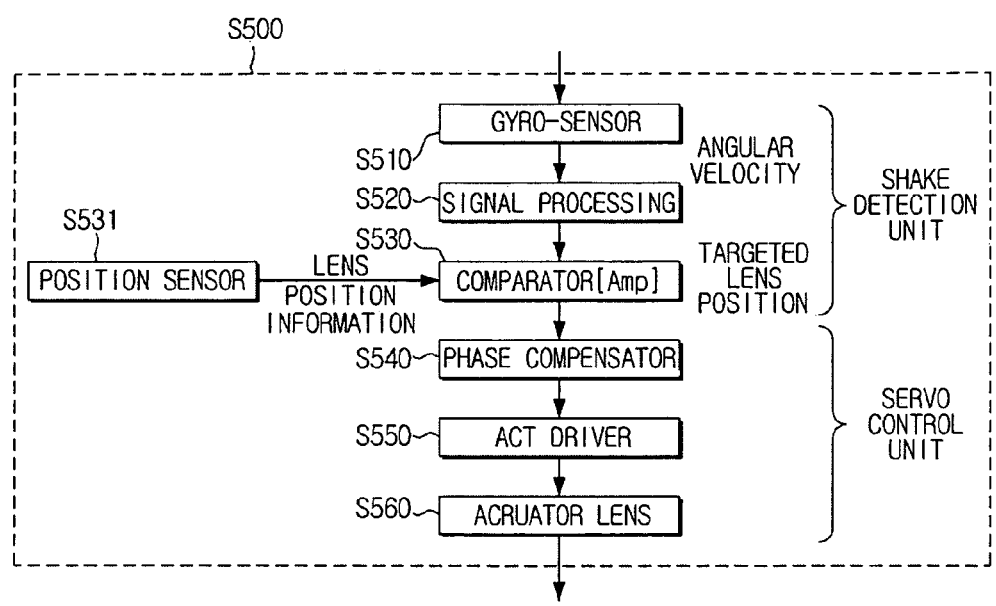

FIG. 28 illustrates an image stabilization process. As illustrated, if a sensor such as a gyro sensor outputs a signal sensing the movement of the rotor 130 (S510), the sensing signal is processed and output to a comparator (S520). The comparator receives a signal sensed by a position sensor (S531) and processes it with the sensing signal (S530). Subsequently, a phase compensator calculates a compensation value according to displacement of the rotor 130 using the input value (S540). If the compensation value is calculated, a controller operates a driver to adjust the operation of an actuator (S550) so that displacement of the lens assembly 136 installed in the rotor 130 may be compensated. Consequently, shaking of the rotor 130 due to external vibration such as hand tremors may be compensated (S560).

Figure 29:
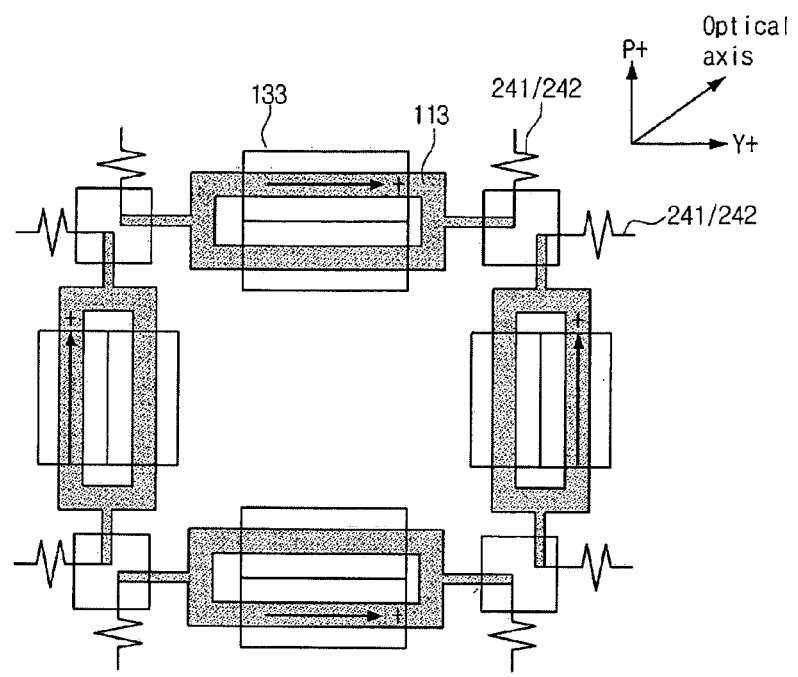
FIG. 29 is a diagram schematically modeling an image stabilizer according to a second embodiment.

FIG. 29 is a diagram schematically modeling an image stabilizer according to a second embodiment.

The lens assembly 136 is disposed on the rotor 130 to operate perpendicular to the optical axis as indicated using the arrows. That is, each direction is a pitch direction or a yaw direction. The polarized magnet 113 and the corresponding driving coil 133 are disposed in each direction. The magnet 113 are attached to the first stator 110 and the second stator 120.

Figure 30:
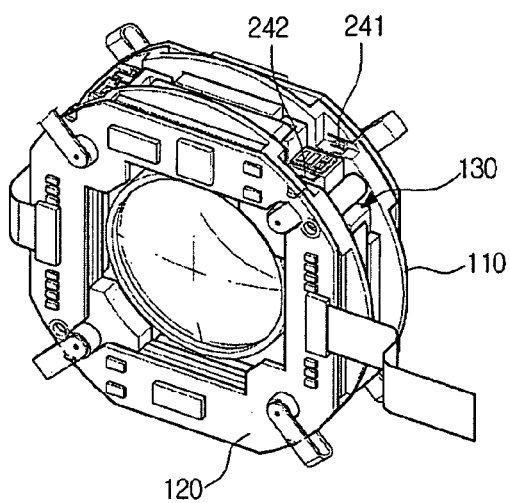
FIG. 30 is a perspective views illustrating an image stabilizer according to the second embodiment.

In the image stabilizer according to the second embodiment, a first suspension member 241 and a second suspension member 242 which support a rotor 130 with respect to a first stator 110 and a second stator 120, respectively, may have a plurality of curved portions, as illustrated in FIG. 30 through FIG. 36. Other than this, a structure of the image stabilizer according to the second embodiment is the same as a structure of the image stabilizer according to the first embodiment, so like elements are described using like reference numerals. As illustrated in FIG. 30, in the image stabilizer according to the second embodiment, the rotor 130 is disposed between the first stator 110 and the second stator 120 so as to move perpendicular to the optical axis, and is connected to the first stator 110 and the second stator 120 via the first suspension member 241 and the second suspension member 242 so as to apply an electric current to the first stator 110 and the second stator 120.

Figure 31:
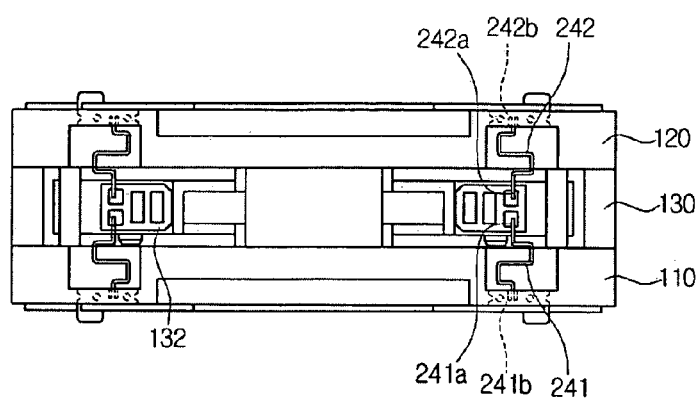
FIG. 31 is a side view of the image stabilizer of FIG. 30.
Figure 32:
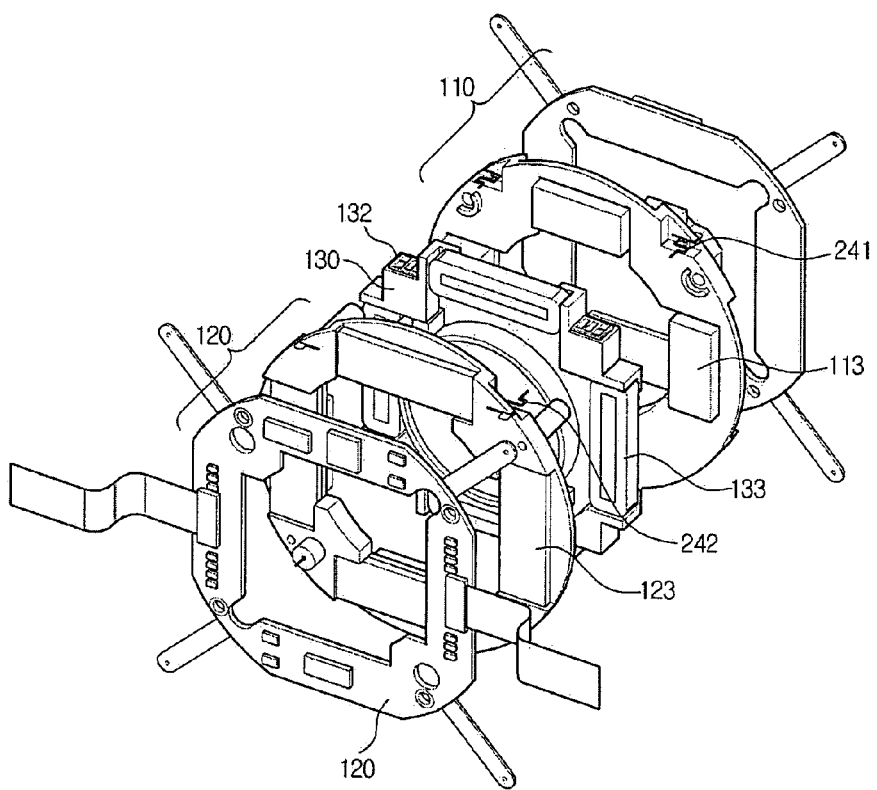
FIG. 32 is an exploded perspective view illustrating the image stabilizer of FIG. 30.

FIG. 31 is a side view of the image stabilizer of FIG. 30 in which the rotor 130 is connected to the first stator 110 and the second stator 120 via the first suspension member 241 and the second suspension member 242. As illustrated in FIG. 31, a side printed circuit substrate 132 is provided on a side wall of the rotor 130, and the first suspension member 241 and the second suspension member 242 are connected to first ends of a first connection part 241a and a second connection part 242a, respectively, using soldering. A first pad 241b and a second pad 242b are formed on second ends of the first connection part 241a and the second connection part 242a, respectively, and are thus inserted into and connected to the first stator 110 and the second stator 120. That is, when injection-molding the first stator 110 and the second stator 120, the first suspension member 241 and the second suspension member 242 are also inserted into a mold, so the first pad 241b and the second pad 242b can be molded with the first stator 110 and the second stator 120 at a time.

Figure 33:
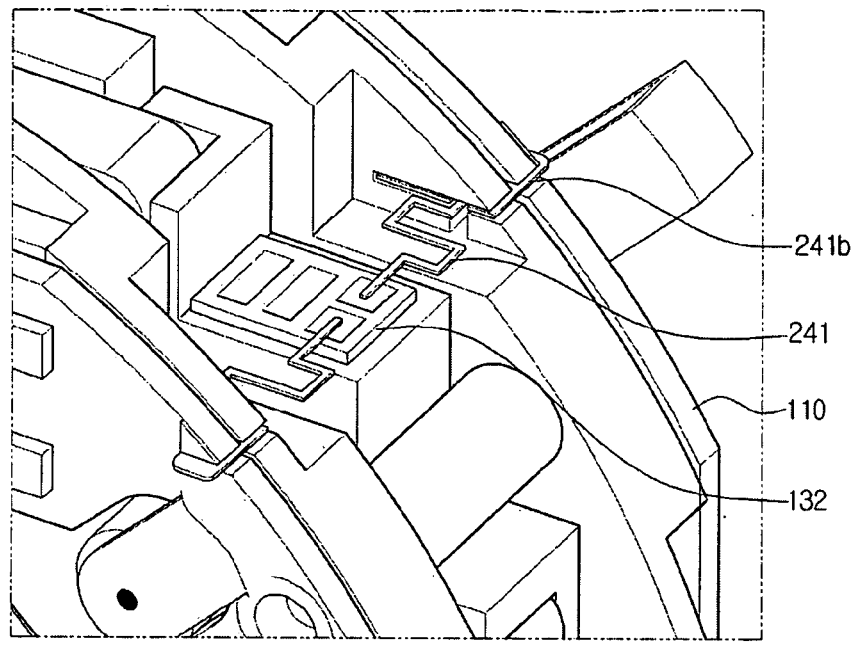
FIGS. 33 and 34 are perspective views enlarging the principal part of the image stabilizer of FIG. 30.
Figure 34:
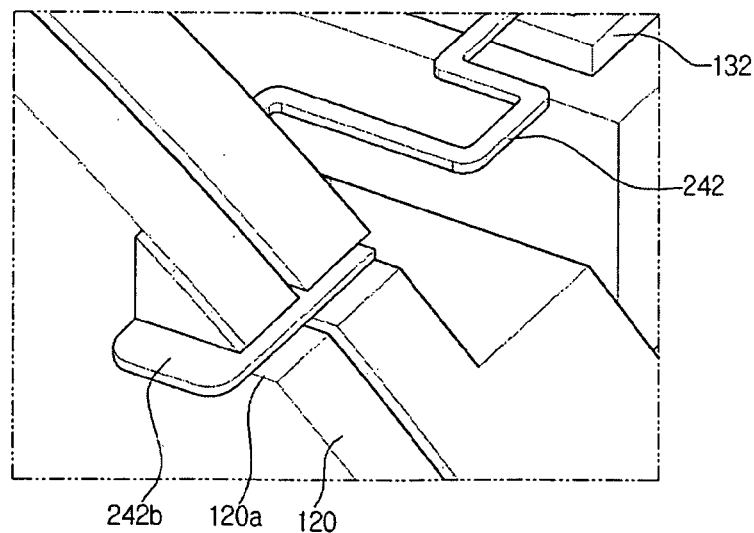

As a result, as illustrated in FIGS. 33 and 34, the first suspension member 241 and the second suspension member 242 are integrally formed with the first stator 110 and the second stator 120, so when the rotor 130 is connected to the first stator 110 and the second stator 120, it is only needed that the first connection part 241a and the second connection part 242a are connected to the side printed circuit substrate 132 using soldering. Subsequently, the rotor 130 is electrically connected to the first stator 110 and the second stator 120. Therefore, assembling is easy.

Figure 35:
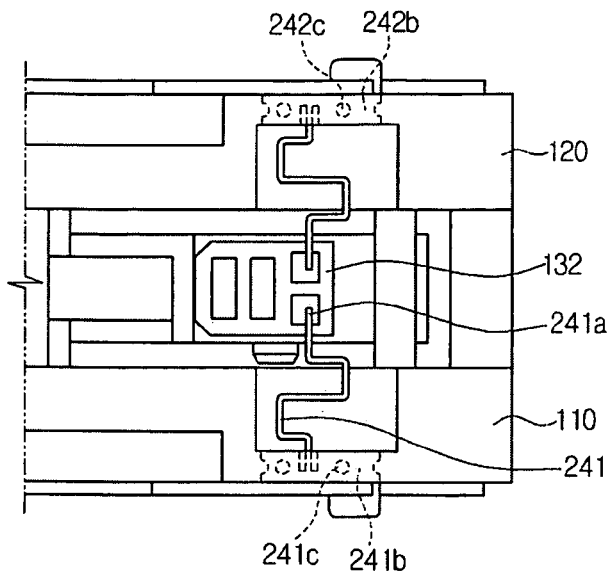
FIG. 35 is a side view illustrating a structure of a first suspension unit and a second suspension unit of the image stabilizer according to the second embodiment.

As illustrated in FIG. 35, the first pad 241b may have a plurality of boss holes 241c, and the second pad 242b may have a plurality of boss holes 242c. The boss holes 241c and 242c fix the first suspension member 241 and the second suspension member 242, respectively.

That is, if the first suspension member 241 and the second suspension member 242 are injection-molded with the first stator 110 and the second stator 120, a resin constituting the first stator 110 and the second stator 120 fills up the boss holes 241c and 242c, thereby preventing separation of the first suspension member 241 and the second suspension member 242.

Figure 36:
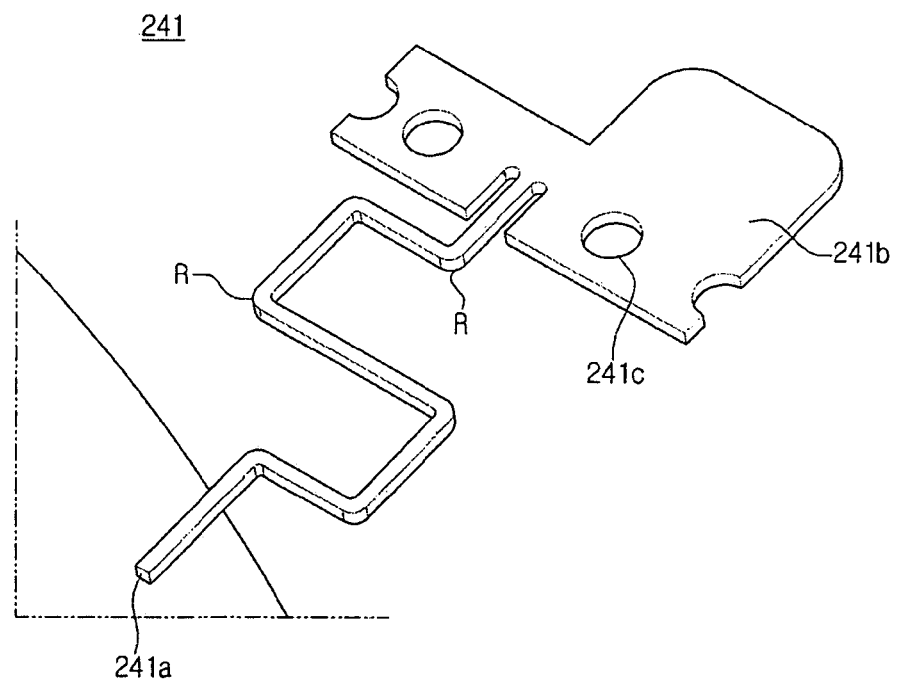
FIG. 36 is a perspective view illustrating a first suspension member of the image stabilizer according to the second embodiment.

FIG. 36 is a perspective view illustrating the first suspension member 241 of the image stabilizer according to the second embodiment.

As illustrated in FIG. 36, the first suspension member 241 has a plurality of curved portions, and the curved portions indicated using R are rounded. That is, the first suspension member 241 has multiple bending so as to support up and down movements of the rotor 130 together with the second suspension member 242. Accordingly, in order to prevent fatigue fracture of the first suspension member 241, fragile points are rounded, so this can avoid reaching the yield strength of the first suspension member 241.

Figure 37:
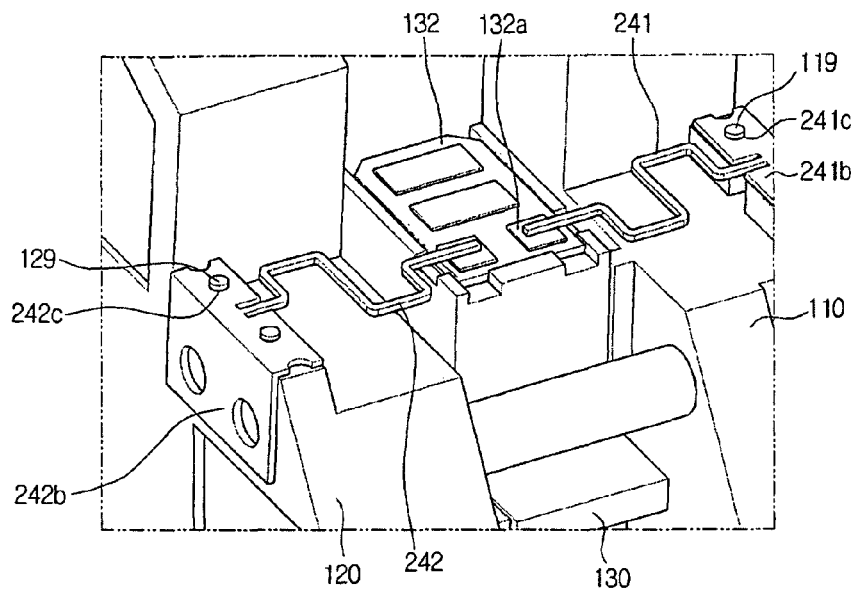
FIG. 37 is a perspective view illustrating a fixing state of a first suspension unit and a second suspension unit of an image stabilizer according to a third embodiment.

In an image stabilizer according to a third embodiment as shown in FIG. 37, a first suspension member 241 and a second suspension member 242 may be assembled after a first stator 110, a second stator 120, and a rotor 130 are firstly assembled.

To this end, the first stator 110 and the second stator 120 include fixing bosses 119 and 129, respectively, to fix the first suspension member 241 and the second suspension member 242, and the first suspension member 241 and the second suspension member 242 include pads 241b and 242b having boss holes 241c and 242c corresponding to the fixing bosses 119 and 129, respectively. Accordingly, the bosses 119 and 129 penetrating the boss holes 241c and 242c are pressed at a high temperature so as to fix the first suspension member 241 and the second suspension member 242.

A side printed circuit substrate 132 includes electrical connection pads 132a to be in contact with a first connection part 241a and a second connection part 242a, so if the first connection part 241a and the second connection part 242a are pressed to be in contact with the electrical connection pad 132a, a rotor 130 can be electrically connected to the first stator 110 and the second stator 120.

Since the image stabilizers according to the second and third embodiments operate in the same manner as the image stabilizer according to the first embodiment, detailed description is not repeated.

As may be appreciated from the above description, an image stabilizer 100 according to an embodiment may prevent variance of characteristics of a rotor in a low frequency band according to the position and distortion of phase characteristics in a high frequency band. Therefore, the image stabilizer 100 may have consistent operation characteristics regardless of the position and posture of a person using an image capture device that incorporates the image stabilizer 100.

Furthermore, since characteristic distortion does not occur in a high frequency band, the operating band ensured by an actuator consisting of a rotor and a stator extends and thus response to shake frequency increases. Moreover, since suspension members are symmetrically arranged with respect to the rotor, malfunction of the image stabilizer without ball bearings in an existing lateral suspension structure may be prevented.

While the disclosure has been particularly shown and described with reference to several embodiments thereof with particular details, it will be apparent to one of ordinary skill in the art that various changes may be made to these embodiments without departing from the principles and spirit of the invention, the scope of which is defined in the following claims and their equivalents.

What is claimed is:
1. An image stabilizer, comprising:
a rotor comprising a lens assembly, and configured to move perpendicular to an optical axis of light passing through the lens assembly; and
a suspension unit configured to support movement of the rotor and to prevent the rotor from moving non-perpendicular to the optical axis of the light passing through the lens assembly,
wherein the suspension unit elastically supports the rotor with respect to a first stator and a second stator between which the rotor is disposed, and is formed of materials capable of carrying an electric current so as to supply power to the rotor, and wherein the suspension unit comprises a plurality of first suspension members elastically supporting the rotor with respect to the first stator, the plurality of first suspension members electrically connecting the first stator and the rotor, and a plurality of second suspension members elastically supporting the rotor with respect to the second stator, the plurality of second suspension members electrically connecting the second stator and the rotor.

2. The image stabilizer according to claim 1, wherein the first suspension members and the second suspension members are symmetrically disposed with respect to the rotor.

3. The image stabilizer according to claim 2, wherein the first suspension members and the second suspension members comprise the same physical characteristics, and are formed as one of wires and plates made of metallic materials capable of carrying an electric current.

4. The image stabilizer according to claim 1, wherein the rotor comprises a plurality of driving coils disposed around the lens assembly, and a plurality of side printed circuit substrates electrically connected to the first stator and the second stator, the first stator and the second stator respectively comprise a plurality of magnets disposed on a surface corresponding to the plurality of driving coils and a first stator printed circuit substrate and a second stator printed circuit substrate;

wherein first ends of the plurality of first suspension members are connected to the side printed circuit substrates, and second ends of the plurality of first suspension members are connected to the first stator printed circuit substrate, and wherein first ends of the plurality of second suspension members are connected to the side printed circuit substrates, and second ends of the plurality of second suspension members are connected to the second stator printed circuit substrate.

5. The image stabilizer according to claim 1, wherein the plurality of first suspension members and the plurality of second suspension members are symmetrically disposed.

6. The image stabilizer according to claim 4, wherein the driving coils and the magnets are symmetrically disposed.

7. The image stabilizer according to claim 6, wherein the first stator and the second stator are connected using a plurality of supporting members, wherein the plurality of supporting members are complementarily formed on the first stator and the second stator.

8. The image stabilizer according to claim 7, wherein the first stator comprises a first stator body and the second stator comprises a second stator body, and the first suspension members and the second suspension members are formed with the first stator body and the second stator body, respectively, by injection molding.

9. The image stabilizer according to claim 7, wherein the first suspension members and the second suspension members are respectively inserted into and connected to the first stator body and the second stator body.

10. The image stabilizer according to claim 9, further comprising:

a locking unit for fixing the rotor to prevent movement if power is not supplied to the rotor, and for releasing locking of the locking unit if power is supplied to the rotor.

11. The image stabilizer according to claim 8, wherein the first suspension members and the second suspension members comprises a plurality of curved portions.

12. The image stabilizer according to claim 11, wherein the curved portions of the first suspension members and the second suspension members are rounded.

13. The image stabilizer according to claim 12, wherein the first suspension members and the second suspension members comprise a plurality of bosses and a plurality of boss holes so as to be fixed to the first stator body and the second stator body, respectively.

14. The image stabilizer according to claim 7, wherein the first stator body and the second stator body comprise fixing bosses to fix the first suspension members and the second suspension members, respectively, and the first suspension members and the second suspension members comprise a pad comprising boss holes corresponding to the fixing bosses, wherein the first suspension members and the second suspension members are fixed by pressing the fixing bosses penetrating the boss holes at a high temperature.

15. An image stabilizer, comprising:

a first stator and a second stator, a rotor comprising a lens assembly, and configured to move perpendicular to an optical axis of light passing through the lens assembly; and a suspension unit configured to elastically support the rotor, the first stator, and the second stator so as to electrically connect the rotor, the first stator, and the second stator, the suspension unit comprising a plurality of curved portions so as to prevent the rotor from moving non-perpendicular to the optical axis of the light passing through the lens assembly, wherein the suspension unit elastically supports the rotor with respect to the first stator and the second stator between which the rotor is disposed, and is formed of materials capable of carrying an electric current so as to supply power to the rotor, and wherein the suspension unit comprises a plurality of first suspension members elastically supporting the rotor with respect to the first stator, the plurality of first suspension members electrically connecting the first stator and the rotor, and a plurality of second suspension members elastically supporting the rotor with respect to the second stator, the plurality of second suspension members electrically connecting the second stator and the rotor.

\* \* \* \* \*